INVENTORS
HAROLD E. ELLER &
HUBERT DRECKMANN
BY
*Eugene C. Knoblock*
ATTORNEY

# United States Patent Office 3,471,776
Patented Oct. 7, 1969

3,471,776
FLUID BRIDGE METHOD AND MEANS OF
DETECTING GASES HAVING MAGNETIC
SUSCEPTIBILITY
Harold E. Eller and Hubert Dreckmann, Michigan City, Ind., assignors to The Hays Corporation, Michigan City, Ind.
Filed Jan. 9, 1968, Ser. No. 696,570
Int. Cl. G01r 33/12
U.S. Cl. 324—36          6 Claims

ABSTRACT OF THE DISCLOSURE

A method and means for measuring a gas having magnetic susceptibility in which a sample gas is divided into two similar flows in which magnets and heating means cooperate to generate magnetic winds of the same magnitude but acting in opposite directions to create a pressure differential. A second gas is supplied centrally to a cross passage connecting said flows downstream from said wind generating means, and the rates of flow of said second gas to the respective first flows are detected and calibrated as a measure of the gas of magnetic susceptibility in the sample gas.

SPECIFICATION

This invention relates to improvements in method and means of detecting gases having magnetic susceptibility, such as oxygen.

Various types of devices have been developed heretofore to utilize the unique magnetic properties of oxygen and other gases having magnetic susceptibility in apparatus for determining the concentration of such a gas in a gas mixture. In one type of prior apparatus commonly referred to as a paramagnetic detector the apparatus measures either the force exerted by a magnetic field upon a volume of subject gas or the pressure exerted by a volume of subject gas attracted to a magnetic field. Examples of paramagnetic detectors are to be found in U.S. Patents 2,416,344, 2,666,893 and 3,026,472. The paramagnetic detectors have one substantial disadvantage in common in that they are affected by the diamagnetism of the background gases and must be compensated for such effects in order to achieve accurate results.

Another prior type of apparatus is known as an inductive detector. Apparatus of this character measures the magnetic permeability of a gas which is related to the magnetic susceptibility of the gas according to:

$$X = 1 + 4Y$$

where X equals permeability and Y equals susceptibility. Examples of inductive detectors are to be found in U.S. Patents 2,467,211, 2,930,970, 3,049,665 and 3,076,929. The inductive detectors of this type, like the paramagnetic detectors are affected by the diamagnetism of the background gases.

Another type of detector utilizing the magnetic properties of a subject gas is known as a thermal magnetic detector. Thermal magnetic detectors measure pneumatic and/or thermal effects caused by a so-called magnetic wind generated therein and proportional to the gas of magnetic susceptibility. Examples of thermal magnetic detectors are to be found in U.S. Patents 2,603,964, 2,763,151, 2,815,659 and 3,045,474. Most thermal magnetic detectors are not affected by the diamagnetism of the background gases, but they are affected to varying degrees by other physical parameters of background gases such as the thermal conductivity, the density, the viscosity or the heat capacity of the background gases, or combinations of such parameters. One special type of thermal magnetic detector, shown in German Patent No. 1,181,945 and French Patent No. 1,336,252, is affected by physical parameters such as thermal conductivity, density, viscosity and heat capacity of the gas to only a slight extent, but is affected by the diamagnetism of the background gases.

Another type of prior apparatus may be referred to as a divided path differential pressure detector. Such an apparatus is shown in U.S. Patent 3,191,425 and requires the use of moving or rotatable magnets and other structural characteristics which render them complicated and expensive.

It is the primary object of this invention to provide a simple and inexpensive oxygen detector which requires a minimum number of parts to produce highly accurate results which are substantially free from the effects of the properties and parameters of background gases.

A further object is to provide a method of this character wherein a sample gas being measured is divided into two flows or streams in which magnets and heating means generate magnetic winds acting in opposite directions to respectively enhance gas flow in one stream and retard gas flow in the other stream so as to create a pressure differential across the two streams, and a second gas is admitted to said flows in two streams whose flow rates are proportional to the pressure differential and are measured and calibrated to provide an indication of the gas component which has magnetic susceptibility.

A further object is to provide a device of this character wherein stationary means act upon gas flowing in two different paths from a gas sample to an outlet to generate opposed magnetic winds altering the gas pressures in the respective paths in a manner to create a pressure difference which regulates the rates at which a second gas enters said paths and flows past measuring means whose operation indicates the percentage of a gas of magnetic susceptibility existing in the gas sample.

Other objects will be apparent from the following specification.

Figure 1:
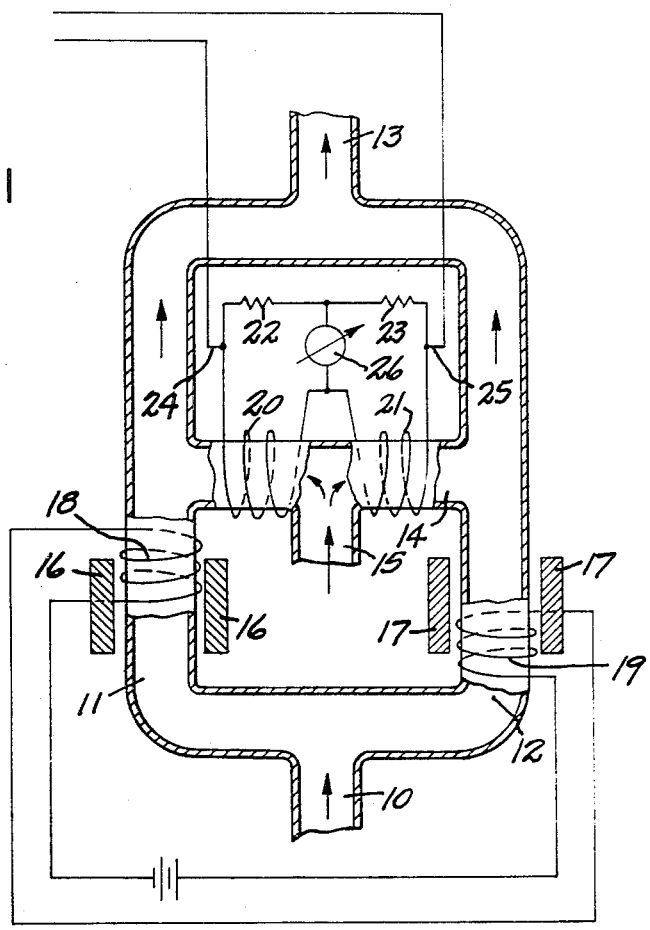
FIG. 1 is a schematic view of apparatus constituting an embodiment of this invention.

This invention entails the division of a sample gas from an inlet into two similar flow paths communicating with an outlet and also communicating spaced from the outlet at a cross passage. The gas flowing in each path from the inlet to the cross passage is subjected to the action of a magnet and a heating coil, one of which is positioned in a manner to generate a magnetic wind flowing in a direction toward the outlet and the other of which generates a magnetic wind tending to flow in the direction of the inlet. The opposite effects of the respective magnetic winds upon the divided flow paths enhances gas flow in one path and retards gas flow in the other to create a differential pressure which exists at the cross passage. A supply of a second gas of known constant composition communicates with the cross passage centrally thereof, and heater windings are located at the opposite end portions of the cross passage and are subjected to the effect of flow in the respective ends of the cross passage in a manner to vary the resistance of the heater windings, which differences in resistance are measured in a Wheatstone bridge circuit and calibrated in terms of the percentage of the gas of magnetic susceptibility which is contained in the sample gas.

In the embodiment of the invention here illustrated, a sample gas containing a gas having magnetic susceptibility which is to be detected is supplied to an inlet passage 10 from which diverge or branch a pair of passages 11 and 12 which are of the same size, cross section and shape and which converge at an outlet 13. The branch passages 11 and 12 are interconnected intermediate their lengths by a cross passage 14. Mid length of the cross passage 14 is an inlet passage 15 communicating with a source of an auxiliary gas of a known constant composition than the gas supplied at inlet 10.

At a selected point along the branch passage 11 between the inlet 10 and the cross passage 14 is positioned a magnet 16. A second similar magnet 17 is similarly positioned with respect to the second branch passage 12. The magnets are preferably permanent magnets, but may be electromagnets energized by either direct current or alternating current. The magnets have their pole pieces similarly arranged relative to passages 11 and 12, which may constitute stainless steel or glass tubes, so that similar magnetic flux fields are generated through which the sample gas flows. A heater coil 18 for heating the gas in passage 11 adjacent the magnet 16 is offset from the magnet along the flow path in the direction of the outlet. A similar heater coil 19 cooperates with the magnet 17 and is offset longitudinally therefrom in the direction of the inlet. Coils 18 and 19 may encircle the passages or be located in the passages. Magnet 16 and heater coil 18 cooperate to generate a magnetic wind in the direction of the outlet while magnet 17 and heater coil 19 cooperate to generate in passage 12 a magnetic wind of the same magnitude as that generated in passage 11 by the parts 16 and 18 but which acts in the opposite direction so as to retard the flow of the gas sample through the passage 12.

The arrangement of the magnetic wind generating systems 16, 18 and 17, 19 in opposed relation in different branch passages of the flow path in this device serves the following functions: (a) it cancels the diamagnetic effects of the sample gas; (b) it cancels chimney effects in the system; and (c) it doubles the magnetic wind effect.

Figure 2:
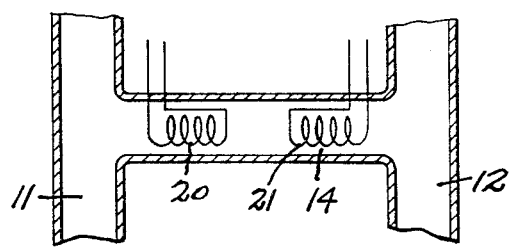
FIG. 2 is a schematic view of a modification of the device.

An electrical resistance element 20 is positioned around the cross passage 14 as seen in FIG. 1 or within said cross passage as in FIG. 2 between the auxiliary gas inlet 15 and branch passage 11, and a resistance element 21 of equal value is similarly positioned at cross passage 14 between auxiliary gas inlet 15 and branch passage 12. The electric resistance elements 20 and 21 are connected in two different legs of a Wheatstone bridge circuit whose outer legs are provided with fixed resistance elements 22 and 23 respectively. The Wheatstone bridge is supplied with current at the terminals 24 and 25 thereof respectively connected between resistors 20 and 22 and between resistors 21 and 23. A galvanometer or other measuring instrument 26 is connected across the bridge circuit with one terminal being connected between the fixed resistors 22 and 23 and the other terminal thereof being connected between the resistors 20 and 21.

The method of detecting the gas of magnetic susceptibility such as oxygen by the use of this apparatus entails the supply of a sample gas at the inlet 10 from which it is divided to flow through similar passages 11 and 12 to the outlet 13. A magnetic wind is generated in passage 11 by magnet 16 and heater coil 18 and acts in a direction toward the outlet to enhance the flow of gas in the passage 11. At the same time a magnetic wind of equal value to that in passage 11 is generated by magnet 17 and coil 19 and acts in a direction counter to the direction of gas flow through the passage 12 so as to retard gas flow in passage 12. A second gas of a known constant composition is supplied at the inlet 15 to the cross passage 14 and flows through cross passage 14 in opposite directions at different rates depending upon the pressure differential in the passages 11 and 12 and tending to compensate for and equalize the gas pressure in the portions of passages 11 and 12 between the cross passage 14 and the outlet 13. The difference in the rate of flow of the auxiliary gas past the two heater elements 20 and 21 causes the resistance of one thereof to be altered to a greater extent than the other, thereby unbalancing the Wheatstone bridge circuit. The extent of unbalance of the bridge is detected and measured by the measuring instrument 26 which can be calibrated in terms of the percentage of the gas of magnetic susceptibility existing in the gas sample.

The differential cooling effect of the two resistance elements 20 and 21 which is caused by the flow of the auxiliary gas which is preferably of a predetermined composition is not affected by the fluctuating physical properties of the background gas. In other words, the properties of the background gas, such as viscosity, heat capacity, density, thermal conductivity and diamagnetism, may fluctuate without affecting the reading of the apparatus, since the device operates independent of changes in the background gas composition.

I claim:
1. The method of gas detection consisting of the steps of
    directing two equal portions of a gas sample in similar paths from an inlet to an outlet,
    establishing a communication path between said first paths intermediate the length thereof,
    supplying a second gas to said communicating path midway between said first paths,
    generating in the portion of one of said first flow paths between said inlet and said communication path a magnetic wind acting in a direction toward said outlet,
    generating in the portion of the other of said first flow paths between said inlet and said communication path a magnetic wind equal to said first named magnetic wind and acting in a direction toward said inlet, and
    measuring the difference in the rate of flow of said second gas in the opposite end portions of said communicating path toward said first paths.

2. The method of gas detection defined in claim 1, wherein
    each of said magnetic winds is generated by the flow of sample gas through the flux field of a magnet and past a heating means positioned adjacent a magnet and projecting from the magnet in selected direction along said path of gas flow.

3. The method of gas detection defined in claim 1, wherein
    the rates of flow in the opposite end portions of said communicating path are measured by comparing the resistances of heated similar electrical resistance elements positioned similarly at the ends of said communicating path.

4. Means for detecting the quantity of a gas of magnetic susceptibility existing within a sample gas comprising
    means defining two similar sample gas flow passages between an inlet and an outlet and a cross passage connecting said flow passages intermediate their length and having substantially centrally thereof an inlet for a second gas,
    magnets having pole pieces positioned to generate similar magnetic fields at similar positions along said first passages between said inlet and cross passage,
    a heater coil for heating gas in one of said first passages and positioned in selected orientation to and offset in upstream direction from the magnet acting on said passage,
    a heater coil similar to said first named coil for heating gas in the other of said first flow passages and positioned in the same orientation as said first coil but offset in downstream direction from the magnet acting on said other passage, and
    means measuring the respective rates of flow of said second gas in the opposite ends of said cross passage.

5. Means for detecting the quantity of a gas of magnetic susceptibility within a gas sample as defined in claim 4, wherein said last named means constitutes similar electric heating elements similarly positioned at the opposite ends of said cross passage and means for comparing the resistances of said last named heating elements.

6. Means for detecting the quantity of a gas of magnetic susceptibility within a gas sample as defined in claim 4, wherein
said last named means constitutes a Wheatstone bridge circuit having similar electric heating elements connected in different legs thereof and positioned similarly at the opposite end portions of said cross passage.

References Cited

UNITED STATES PATENTS

| 3,240,051 | 3/1966 | Lenfant | 324—36 XR |
| 3,302,448 | 2/1967 | Mocker | 73—23 |

RUDOLPH V. ROLINEC, Primary Examiner

A. E. SMITH, Assistant Examiner

U.S. Cl. X.R.

73—23